United States Patent [19]

Senneron et al.

[11] Patent Number: 5,036,111
[45] Date of Patent: Jul. 30, 1991

[54] EXPANDED MATERIALS WITH NADIMIDE RESIN BASE

[75] Inventors: Michel Senneron, Meylan; Gilbert Parrain, Diemoze; Guy Rabilloud, Grenoble; Bernard Sillion, Lyons, all of France

[73] Assignee: Centre D'Etude des Materiaux Organiques Pour Technologies Avancees, Vernaison, France

[21] Appl. No.: 597,666

[22] Filed: Oct. 17, 1990

[30] Foreign Application Priority Data

Oct. 17, 1989 [FR] France .................. 89 13657

[51] Int. Cl.$^5$ .............................................. C08J 9/02
[52] U.S. Cl. ...................................... 521/182; 521/77; 521/184; 521/185; 521/189; 525/422; 525/426; 525/445; 525/471
[58] Field of Search .................. 521/77, 182, 184, 185, 521/189; 525/422, 426, 445, 471

[56] References Cited

U.S. PATENT DOCUMENTS

| | | | |
|---|---|---|---|
| 3,712,932 | 1/1973 | Balme et al. | 260/857 PI |
| 3,862,918 | 1/1975 | Laurent et al. | 260/37 N |
| 4,360,604 | 11/1982 | Gagliani et al. | 521/189 |
| 4,425,441 | 1/1984 | Gagliani et al. | 521/189 |

FOREIGN PATENT DOCUMENTS 2610938 8/1988 France .

*Primary Examiner*—Morton Foelak
*Attorney, Agent, or Firm*—Millen, White & Zelano

[57] ABSTRACT

Expanded material obtained by heating a composition comprising at least one thermosetting nadimide resin, said heating being performed at a temperature and during a period which are sufficient to cause the expansion of said composition by release of cyclopentadiene. A nadimide resin of the polyimide type and having a number average molecular weight of 600 to 10,000 is preferably used. The composition further comprises preferably 1% to 50% by weight of a linear, preferably thermostable polymer.

20 Claims, No Drawings

EXPANDED MATERIALS WITH NADIMIDE RESIN BASE

This invention relates to the field of expanded materials often called foams or cellular materials and, more particularly, it has as its object thermostable and self-extinguishable expanded materials.

The expanded materials of this invention are obtained from a composition comprising at least one thermosetting oligomer of special imide type called below in this description nadimide, of nadimide type or of methyl nadimide type, characterized in that it is terminated by ethylene reagent groups attached to imide rings prepared from bicyclo[2,2,1]heptene-5 dicarboxylic-2,3 acid called below in this description nadic acid or from one of its derivatives such as, for example, nadic anhydride, and the organic mono-or di-esters of this acid, and from methyl-5 bicyclo[2,2,1]heptene-5 dicarboxylic-2,3 acid called methyl nadic acid, or from one of its derivatives. The expanded materials of this invention are obtained by a process using the reaction heat of the decomposition of the norbornene rings to achieve the expansion of the material.

BACKGROUND OF THE INVENTION

Rigid or flexible cellular materials, with a polyimide base, have been produced by many methods, either from linear polymers of high molecular weight, or from oligomers, or also from mixtures of monomer reagents. One of the oldest techniques, described, among others, in patents US-A-3,249,561 and US-A-3,883,452 in the name of Du Pont de Nemours, consists in producing a polyimide foam from a polyamide-acid solution in the presence of an agent which decomposes during the heating making possible the formation of the polyimide, by releasing a gas such as carbon dioxide or carbon monoxide. This process is relatively difficult to use because the starting polymer is in diluted solution in a polar organic solvent and it is necessary to control simultaneously the evaporation of the solvent, the imidation reaction and the formation of the cellular structure. With the thermoplastic polyimides such as the polyetherimides, sold by the General Electric company under the trade name of Ultem, the addition of a blowing agent has been used to create the cellular structure, as is described, for example, in patent US-A-4,732,263 in the name of Mobil Oil. Another method, described in patent US-A-4,077,922 of the Upjohn Company, consists in mixing this polyimide type with glass microspheres.

The method which has been the object of a very large number of publications consists in synthesizing the polyimides by making a bis(ortho-acid ester) aromatic react in the place of an aromatic dianhydride on a diamine or on a mixture of several diamines. This reaction provides, by heating at a high temperature, polyimides with release of one water molecule and one alcohol molecule for each imide ring formed. These two volatile compounds are used for blowing agents in the production of cellular materials in polyimides. Since the amount of volatile products released is relatively large, the reaction is generally conducted in two stages. A first reaction of partial polycondensation is performed in a solution to form imide oligomers which are isolated in the form of powder by precipitation in a nonsolvent medium. This fusible powder, optionally mixed with various additives, is placed in a mold and heated above its melting temperature. The expansion of the material is caused by the continuation of the polycondensation reaction.

This production technique has been used with many mixtures of monomers. By way of illustration of this method, patent US-A-3,502,712, in which the reaction of a diester of benzophenonetetracarboxylic-3,3',4,4' acid with metaphenylenediamine is described, can be cited. The use of a diamine mixture, to form more flexible polyimide foams, comprising aromatic diamines and flexible diamines such as the acrylonitrile-butadiene diamines, is, for example, described in patent US-A-4,456,862 or the diaminopoly(dimethylsiloxanes) in patent US-A-4,535,099.

The various methods set forth above make it possible to produce thermostable foams of polyimides having very varied characteristics. They can be rigid, semiflexible or flexible according to the nature of the monomers or the polymers used to prepare them. They generally have an open porosity, but in some cases, the latter can be closed, and they cover a fairly wide range of density and resistance to compression.

But, in a general way, most of these production processes require a strict control of the synthesis conditions of polymers and of the protocol of use of these polymers to obtain reproducible results.

The polyimide resins called "nadimide resins" have as their main application the production of composite materials with a base of glass fabric or of carbon fibers. They have been described in particular in European patent application EP A-283330, in the name of the applicant. Their use is performed with a very precise thermal cycle, first under vacuum, and then under pressure. The polymerization of the nadic double bonds is fairly complex, because several reactions are superposed in the single addition polymerization. One of these reactions is a Diels-Alder retroreaction during which the nadimide ring is transformed into a maleimide ring with release of a cyclopentadiene molecule as diagrammed by equation 3 below:

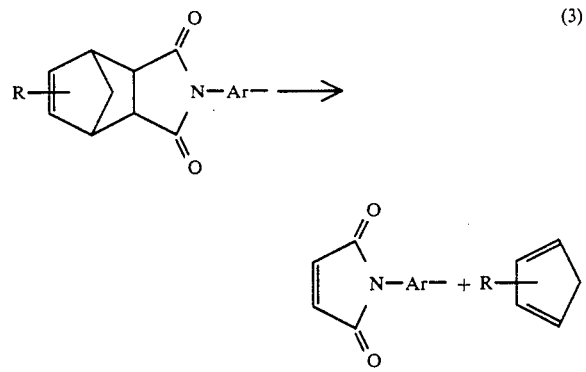

If the thermal polymerization reaction is performed under pressure, the cyclopentadiene formed in this reaction can be copolymerized with the maleic double bonds and thus enter into the macromolecular structure of the final tridimensional lattice. If, on the contrary, the thermal polymerization reaction is achieved without applying pressure or under vacuum, a part of the cyclopentadiene is eliminated in gas form and the structure of the lattice is slightly different.

It could be interesting to try to use the reaction of formation of cyclopentadiene, which occurs at a high temperature, to assure the expansion of the resin and to form an expanded material from these polymers of nadimide type, the cyclopentadiene thus playing the role of a blowing agent. However, the nadimide resins, in particular those of polyimide type, usually have a molecular weight which is relatively low in number, less than 5,000, and the expanded materials obtained from these products are usually rigid and friable.

SUMMARY OF THE INVENTION

In a surprising way, it has now been discovered that it was possible to obtain, under certain conditions, expanded materials exhibiting improved properties, by a process using the formation of cyclopentadiene during heating at a high temperature of a thermosetting oligomer resin with nadimide ends. Under the conditions which will be defined below, the production of an expanded material offers the advantage of being of a very easy use and of making possible, in particular in the case of the use of thermostable nadimide resins, such as, for example, the nadimide resins of polyimide type, the obtaining of an expanded material having an excellent thermal stability, which was able to be achieved only with much difficulty with the processes of the prior art.

It has also been discovered, and this is a particular object of the invention, that for a given molecular weight, the addition to the nadimide resin of at least one small amount of a thermoplastic linear polymer, preferably thermostable, made it possible to obtain, in a surprising way, expanded materials having improved mechanical properties relative to those of the expanded materials formed from a composition containing a nadimide resin and not containing a thermoplastic linear polymer.

By nadimide resins, in the sense of this description, oligomers are designated which are terminated at each end by an imide grouping prepared from bicyclo[2,2,1-]heptene-5 dicarboxylic-2,3 acid or from one of its derivatives and from methyl-nadic acid or from one of its derivatives. These resins can be shown by the following general formula

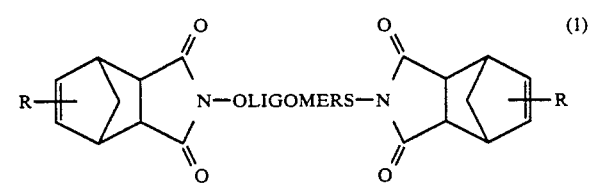

in which the central part "OLIGOMERS" represents a polymer or a mixture of polymers chosen from the polyamides, the polyesters, the polyethers, the polyketones, the polysulfones, the polysulfides and the polyimides whose average molecular weight is about 600 to about 10,000 in number.

In a general manner, the thermostable expanded materials of the invention can be defined as being obtained by heating of a composition comprising 50 to 100% by weight of at least one thermosetting nadimide resin, as defined above, and 0 to 50% by weight of at least one thermoplastic linear polymer, which will be defined below; the heating being performed at a temperature and during a period which are sufficient to cause the expansion of said composition by release of cyclopentadiene, the pressure being less than that in which the cyclopentadiene no longer is released.

For reasons of thermal stability of the macromolecular structure, fusible nadimide resins of polyimide type are preferably used. Such resins can be represented by the following general formula:

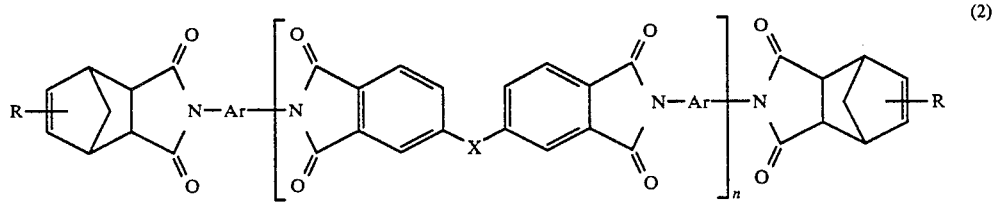

in which Ar, X, n and R are defined as indicated below. In this formula, Ar represents a homocyclic or heterocyclic divalent aromatic radical, whose two valences are located on separate carbon atoms preferably not located in ortho position relative to one another. Radical Ar can be formed by one ring or by more rings, for example, by two to six rings, which are then joined or connected to one another, each ring preferably being formed by five to seven atoms, of which one part can consist of oxygen, sulfur and/or nitrogen atoms, the others being carbon atoms. When radical Ar comprises several rings connected to one another, the connecting elements are, for example, the single bond or one of the following atoms or groupings:

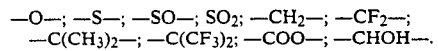

In this formula (2), radical R represents a hydrogen atom or an aliphatic radical comprising 1 to 5 carbon atoms, symbol X, which connects to one another the two rings of the aromatic polyimide part of the molecule, represents a single bond or one of the atoms or groupings of atoms defined above; symbol n represents the degree of polycondensation of the main chain of the aromatic polyimides. The molecular weight of these polyimide compositions terminated by ethylene reagent groups can be adjusted by making the proportions of the various reagents used for their production vary, while respecting the overall stoichiometry between the amine functions and the acid or ester antagonist groups of carboxylic compounds brought into play.

The exact value of number n is not directly accessible, because the compositions used in this invention are formed by a mixture of oligomers whose molecular weights are randomly distributed around an average value which is fixed by the respective proportions of the various reagents brought into play and by the method of synthesis used. The preparation of nadimide resins of formula (2) generally makes three reagents intervene: a derivative of a tetracarboxylic aromatic acid, an aromatic diamine and a derivative of nadic acid or of methyl-nadic acid. The examination of general formula (2) shows that the average value of number n can, however, be easily calculated from the amounts of each of the reagents used. Actually, n moles of tetracarboxylic compound, n+1 moles of primary aromatic diamine and 2 moles of a derivative of the nadic or methyl-nadic acid are necessary.

Of the macromolecular systems meeting formula (2) above, oligomers of polybenzhydrolimide type and, for example, those described in the European patent application in the name of the EP-A-283330 applicant cited above, are used very advantageously. These oligomers are prepared, for example, according to the technique described in this patent application.

According to a first mode of use of the invention, it can be considered to produce thermostable expanded materials from a composition consisting essentially of at least one nadimide or methyl-nadimide resin having an average molecular weight in the range of 6,000 to 10,000 in number, without bringing into play the thermoplastic linear polymer. The expanded materials can then be formed, in an inert atmosphere or under air, under a pressure lower than the atmospheric pressure, equal to the atmospheric pressure or even greater than the atmospheric pressure. In a preferred way, the operation is performed under air at the atmospheric pressure or in a pressure value range going from about 0.08 MPa to 0.12 MPa.

According to a second preferred mode of use of the invention, thermostable expanded materials are produced from compositions comprising, besides at least one nadimide or methyl-nadimide resin having an average molecular weight of 1,000 to 10,000 in number and representing 50 to 99% by weight of the composition, at least one thermoplastic linear polymer, representing 1 to 50% by weight of said composition.

By way of nonlimiting examples of thermoplastic linear polymers which can be used in this invention, polyetherimides can be cited such as, for example, those sold under the trade name Ultem by the General Electric company, polysulfides, for example, phenylene polysulfide, linear arylaliphatic polyimides, aromatic polyimides, polyimidesiloxanes, polyetherketones, and polysulfones, for example, polyethersulfones.

The amount of thermoplastic linear polymer which is added to the nadimide resin depends on the nature of the thermoplastic linear polymer and the average size of the pores that are desired to be obtained in the final expanded material. Most often, a thermostable thermoplastic linear polymer chosen from the group formed by the polyetherimides, the polyethersulfones and the arylaliphatic polyimides is used. The proportion of thermoplastic linear polymer in the starting composition is most often 1 to 20% by weight, the nadimide resin then representing 80 to 99% by weight.

As above, the expanded materials can be formed, in inert atmosphere or under air, under a pressure less than the atmospheric pressure, equal to the atmospheric pressure or even greater than the atmospheric pressure. Preferably, the operation is performed under air at the atmospheric pressure or in a pressure value range going from about 0.08 MPa to 0.12 MPa.

The materials expanded according to this invention are obtained by expansion of a composition containing at least one nadimide or methyl-nadimide resin, and preferably at least one thermoplastic linear polymer, according to a process based on the use at a high temperature of said compositions in solid form, most often in a mold preferably having the dimensions of the object to be produced, in particular when the latter has a relatively simple shape. This use at a high temperature comprises the heating of the composition under conditions making possible the release of cyclopentadiene; this heating will preferably comprise a final stage of a period of at least 30 minutes at a temperature of about 210° C. to about 350° C. with a pressure close to the atmospheric pressure (for example, from 0.08 to 0.12 MPa). Since the expanded materials obtained from a composition comprising at least one nadimide or methyl-nadimide resin and at least one thermoplastic linear polymer have excellent mechanical properties, they can also be produced in the form of prismatic blocks, for example, from which the object to be produced can be machined.

The use at a high temperature of compositions of this invention can be carried out, for example, according to one of the three following variants:

a) The two components are put into a solution either in the same solvent or in solvents which are different but miscible with one another, and the two solutions are mixed intimately. In general, a single solvent, most often N-methylpyrrolidone or diglyme, is used.

The final solution thus obtained is introduced in a mold which is placed in a vacuum oven. The solvent is evaporated under low pressure, for example, at a temperature on the order of 150° C., to obtain, at the bottom of the mold, a resinous solid layer which is usually of a light brown color. The mold is then heated at atmospheric pressure for 30 minutes at about 245° C., then, for example, for 1 hour at about 300° C. During this heat treatment in two stages, there is an expansion of the material and formation of the tridimensional lattice.

b) The two components ground into fine powders are mixed in a powder mixer, for example, for 2 hours. This mixture is placed in the mold and brought to atmospheric pressure, for example at about 245° C. -250° C., then kept at this temperature, for example, for about 30 minutes, then the temperature is increased, for example to 300° C., and this mixture is kept at this temperature, for example, for 1 hour.

c) The two components are put into solution as described in variant a) and this solution is poured into a liquid, for example, an organic liquid, nonsolvent of polymers but preferably miscible with the solvent or solvents of the polymers (such as hexane or methanol) with a very vigorous stirring. Under these conditions, a very fine powder is formed which is isolated, for example, by filtering, and dried, for example, under low pressure. This powder is then used to prepare the expanded material by a heat treatment identical with that described in variant b).

The density of the expanded materials obtained by one or the other of these variants depends both on the chemical composition of the polymers and the composition by weight of the mixture.

The invention will be described in a more precise way by the specific examples given below by way of nonlimiting illustration. First, the preparation of the basic nadimide resin used in the examples is described. One of the basic nadimide resins is a resin of polyimide type prepared from 3.08 moles of methylenebis(benzeneamine)-4,4,' from 2 moles of methyl monoester of nadic acid and from 2.08 moles of methyl diester of benzhydroltetracarboxylic-3,3',4,4' acid in diglyme as a reaction solvent by following the same operating mode as that which is described in example 3 of patent application EP-A-283330 to obtain a solution at 60% by weight of dry material.

EXAMPLE 1 (comparative)

100 grams of a solution obtained as described above is poured slowly into a receptacle containing 250 grams of hexane kept with very vigorous stirring with an agitator-mill with blades of Ultra-Turax type. The grinding is continued for 10 minutes after the end of the addition of the nadimide resin solution. The solid obtained is isolated by filtering then put back in suspension in 250 grams of hexane with low agitation for 15 hours. The solid is then isolated by filtering, washed on the filter with hexane and dried under low pressure equal to 15 mm of mercury (2,000 pascals) for 15 hours at 120° C., then for 3 hours at 150° C. and finally for 5 hours at 160° C. The amount of residual diglyme, measured by nuclear magnetic resonance, is less than 1% by weight.

For the use of the material, 23 grams of this powder is deposited in a uniform layer in a cylindrical metal mold having a diameter of 67 mm. The mold is placed in an oven and subjected to the following heat treatment:
-- Temperature rise to 245° C. in 30 minutes,
-- Plateau at this temperature for 30 minutes,
-- Temperature rise to 300° C. in 20 minutes,
-- Plateau at 300° C. for 2 hours, then
-- Quick cooling to ambient temperature.

The expanded material obtained at the end of this heat treatment has a density of 0.15 g.cm$^{-3}$, it is relatively friable, the diameter of the pores is not homogeneous and varies between about 0.5 mm and 55 mm within the compound. Although this material has an excellent thermal stability (it shows, for example, no weight loss after an aging in the air in an oven with forced ventilation for 500 hours at 250° C.) and although it is self-extinguishable, it presents a weak resistance to weathering and poor mechanical properties of compression, maximum stress: 0.3 MPa, expansion: 5%, modulus of elasticity: 5.5 MPa.

EXAMPLE 2

The two following solutions are prepared separately:
a) A solution of 45.5 grams of Ultem, sold by the General Electric company, in 84.5 grams of N-methylpyrrolidone and
b) a solution of 50 grams of basic nadimide resin in 50 grams of N-methylpyrrolidone.

A composition then is prepared by mixing 21.5 grams of solution a) with solution b). Thus, a solution containing 50 grams of nadimide resin and 7.5 grams of Ultem is obtained, the proportion by weight of the latter polymer relative to the total amount of dry material is about 13%. The solution containing the two compounds is heated, with agitation, for 1 hour at 140° C. under atmospheric pressure. After cooling, it is precipitated in hexane according to the procedure of example 1.

The powder obtained is placed in a mold identical with that used in example I and is subjected to the heat treatment described in this example. A foam of homogeneous polyimide is obtained whose pores, within the compound, have a relatively uniform diameter of about 2 mm. This material has a density of 0.2 g.cm$^{-3}$, it has a thermal stability at 250° C. identical with that which has been measured for the expanded material of example 1 and it is also self-extinguishable. It further has a good resistance to weathering and an excellent dimensional stability up to 350° C.

EXAMPLE 3

A composition is prepared by successive dissolution of 50 grams of basic nadimide resin, then 2.5 grams of Ultem in 75 grams of N-methylpyrrolidone. The solution is heated for 2 hours at 120° C., then cooled and precipitated in methanol with very vigorous stirring. After filtering and drying, the polyimide composition, containing about 4.7% by weight of Ultem, is expanded in a mold by following the heat treatment described in example 1.

The cellular material obtained has a density of 0.18 g.cm$^{-3}$, a pore diameter varying between 1 and 2 mm and a homogeneous distribution of pores within the compound. This material has an excellent thermal stability, it undergoes no weight loss, for example, for 1,000 hours at 220° C., 500 hours at 250° C. or 200 hours at 300° C., and it is, moreover, self-extinguishable. It also has a very good resistance to weathering and an excellent dimensional stability up to 350° C.

EXAMPLE 4

The procedure is performed as in example 3 by using 2.63 grams of Ultem. The solution, after cooling, is precipitated in 500 ml of hexane with very vigorous stirring. The nadimide resin composition contains 5% by weight of Ultem. The cellular material obtained after expansion, as described in example 1, has a density of 0.16 g.cm Moreover, it has properties similar to those indicated for the material of example 3.

EXAMPLE 5

A composition is prepared by dissolution of 50 grams of basic nadimide resin and 2.63 grams of a poly(ethersulfone), obtained by reaction of dichloro-4,4'-diphenylsulfone on bisphenol A in 100 grams of N-methylpyrrolidone. After heating for 1 hour at 120° C., the solution is precipitated in 500 cm$^3$ of hexane with vigorous stirring. After filtering, washing and drying, the composition, containing 5% by weight of poly(ethersulfone), is expanded in a mold according to example 1. The cellular material obtained has a density of 0.18 g.cm$^{-3}$ and a pore diameter less than 1 mm. Its other properties are similar to those of the material of example 3.

EXAMPLE 6

A composition is prepared by successive dissolution of 50 grams of basic nadimide resin, then 2.6 grams of poly(ethersulfone) Udel, sold by the Union Carbide company, in 75 grams of N-methylpyrrolidone. The solution is heated for 1 hour at 120° C., then cooled and precipitated in methanol with very vigorous stirring. After filtering and drying, the nadimide resin composition, which contains about 4.9% by weight of poly(ethersulfone), is expanded in a mold by following the heat treatment of example 1. The cellular material obtained has a density of 0.16 g.cm$^{-3}$, homogeneous pores of a diameter less than 1 mm. This material has an excellent thermal stability, it withstands a temperature of 250° C. for 200 hours. It also has a good resistance to weathering and an excellent dimensional stability up to 350° C.

EXAMPLE 7

The procedure is followed as in example 6, but using 1.55 grams of poly(ethersulfone) Udel. The resin composition contains 3% by weight of poly(ethersulfone). The expanded material obtained has a density of 0.23 g.cm.$^{-3}$. Its other properties are similar to those of the material of example 6.

EXAMPLE 8

A composition is prepared by successive dissolution in 50 grams of diglyme of 50 grams of basic nadimide resin, then of 1.02 grams (or 2% by weight) of a linear arylaliphatic polyimide prepared by polycondensation of the methyl diester of benzhydrol-tetracarboxylic-3,3',4,4' acid and of diamino-1,12-dodecane under standard conditions, such as those described, for example, in the European patent application in the name of the EP-A-232665 applicant. The solution obtained is heated for 2 hours at 100° C., then cooled and precipitated in methanol with very vigorous stirring. After filtering and drying, the polyimide composition is expanded in a mold by following the operating mode described in example 1. The cellular material obtained has a density of 0.19 g.cm$^{-3}$ and homogeneous pores with a diameter less than 1 mm. This material has a good thermal stability, it withstands, for example, a temperature of 220° C. for 500 hours without weight loss. It also has a good resistance to weathering. Finally, it offers an excellent dimensional stability up to 350° C.

EXAMPLE 9

A composition is prepared by mixing in a ball mill 50 grams of basic nadimide resin and 1 gram of the linear arylaliphatic polyimide described in example 8 (or 1.96% by weight). The mixture of powders, expanded in a mold by following the process described in example 1, provides a homogeneous cellular material which has a density of 0.19 g.cm$^{-3}$, homogeneous pores of a diameter less than 1 mm and a very good resistance to weathering. This material has a good thermal stability (no weight loss after 200 hours at 250° C.) and an excellent dimensional stability up to 350° C.

EXAMPLE 10

The following two solutions are prepared separately:
a) a solution of 3.5 grams of Ultem, sold by the General Electric company, in 8 grams of N-methylpyrrolidone and
b) a solution of 50 grams of basic nadimide resin in 50 grams of N-methylpyrrolidone. A composition then is prepared by mixing solution a) with solution b). A solution containing 50 grams of nadimide resin and 3.5 grams of Ultem thus is obtained, the proportion by weight of the latter polymer relative to the total amount of dry material is about 6.6% by weight. The latter solution is introduced in a mold which is then placed in a vacuum oven. The solvent is then evaporated under low pressure of 15 mm of mercury (or about 2,000 pascals) by heating to a temperature on the order of 150° C.; thus, at the bottom of the mold, a resinous solid layer of a light brown color is obtained. The mold is then heated to atmospheric pressure according to the protocol described in example 1. A homogeneous polyimide foam is obtained whose pores, within the compound, have a uniform diameter of about 2 mm. This material has a density of 0.19 g.cm$^{-3}$, it has a thermal stability identical with that of the expanded material described in example 2, a good resistance to weathering and an excellent dimensional stability up to 350° C.

EXAMPLE 11

A composition is prepared by successive dissolution of 50 g of methyl-nadimide resin (prepared by a reaction of 3.08 moles of methylenebis(benzeneamine)-4,4', of 2 moles of methyl monoester of methyl-nadic acid and of 2.08 moles of methyl diester of benzhydroltetracarboxylic-3,3',4,4' acid in diglyme) and of 2.5 grams of Ultem in 60 grams of N-methylpyrrolidone. The solution is heated for 1 hour at 60° C., then cooled and precipitated in methanol with vigorous stirring. After filtering and drying, the polyimide composition, containing about 4.7% by weight of Ultem, is expanded in a mold by following the heat treatment of example 1.

The cellular material obtained has a density of 0.25 g.cm$^{-3}$, the pore diameter varies from 1 to 3 mm. This self-extinguishable material has an excellent thermal thermostability: it undergoes no weight loss after 500 hours at 200° C.

EXAMPLE 12

The mechanical properties in compression and in the shearing of the expanded materials prepared in examples 4, 5, 7, and 8 have been determined. The results are given in the following tables 1 and 2. In table 1, the density of the material has been recalled. The mechanical properties in compression (maximum stress, expansion and modulus of elasticity) are quite superior to those of the material whose preparation is described in example 1.

The entire disclosures of all applications, patents and publications, if any, cited above, and of corresponding application French 89/13,657, filed Oct. 17, 1989, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE 1

| Material of the example | (Compression) | | | |
|---|---|---|---|---|
| | 4 +5% Ultem | 5 +5% polyethersulfone | 8 +2% polyimide C 12 | 7 +3% Udel |
| DENSITY | 0.16 | 0.18 | 0.19 | 0.23 |
| MAXIMUM STRESS MPa | 1.7 | 2.1 | 2.4 | 3.2 |
| SPECIFIC STRESS MPa | 11 | 12 | 13 | 14 |
| ELONGATION % | 6.5 | 3.9 | 8 | 5.5 |
| MODULUS OF ELASTICITY MPa | 40 | 60 | 49 | 97 |
| SPECIFIC | 250 | 330 | 260 | 420 |

TABLE 1-continued

| | (Compression) | | | |
|---|---|---|---|---|
| | 4 | 5 | 8 | 7 |
| Material | +5% | +5% | +2% | +3% |
| of the example | Ultem | polyethersulfone | polyimide C 12 | Udel |
| MODULUS MPa | | | | |

TABLE 2

| | (Shearing) | | | |
|---|---|---|---|---|
| | 4 | 5 | 8 | 7 |
| Material | +5% | +5% | +2% | +3% |
| of the example | Ultem | polyethersulfone | polyimide C 12 | Udel |
| DENSITY | 0.16 | 0.18 | 0.19 | 0.23 |
| SHEARING STRESS MPa | 1.2 | 1.3 | 1.8 | 1.7 |
| SPECIFIC STRESS MPa | 7.5 | 7 | 9.5 | 7.5 |

What is claimed is:

1. Expanded material characterized in that it is obtained by heating a composition comprising 50 to 100% by weight of at least one thermosetting oligomer resin, with nadimide or methyl-nadimide ends having an average molecular weight of 600 to 10,000 in number and of 0 to 50% by weight of at least one thermoplastic linear polymer, said heating being performed at a temperature and for a period which are sufficient to cause the expansion of said composition by release of cyclopentadiene and under a pressure lower than that in which the cyclopentadiene is no longer released.

2. Expanded material according to claim 1, wherein said oligomer resin with nadimide or methyl-nadimide ends is chosen from the polyamides, the polyesters, the polyethers, the polyketones, the polysulfones, the polysulfides and the polyimides.

3. Expanded material according to claim 2, wherein said oligomer resin with nadimide or methyl-nadimide ends is chosen from the polyimides meeting the general formula

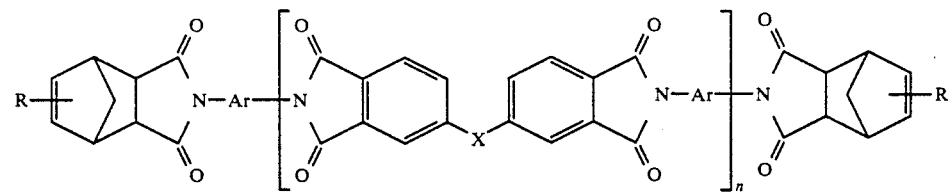

in which Ar represents a heterocyclic or carboxylic divalent aromatic radical, whose two valences are located on separate carbon atoms; X represents a single bond or a divalent atom or grouping chosen from —O—; —S—; —SO—; $SO_2$—; —$CH_2$—; —$CF_2$—; —$C(CH_3)_2$—; —$C(CF_3)_2$; —COO—; —CHOH—, n represents the degree of polycondensation of the polyimide chain and R represents a hydrogen atom or an aliphatic radical comprising 1 to 5 carbon atoms.

4. Expanded material according to claim 3, wherein said oligomer resin with nadimide or methyl-nadimide ends is of polybenzhydrolimide type, X representing —CHOH— in the formula.

5. Expanded material according to claim 1, wherein it is obtained by heating of a composition consisting essentially in at least one oligomer resin with nadimide or methylnadimide ends having an average molecular weight of 6,000 to 10,000 in number.

6. Expanded material according to claim 5, wherein the heating of said composition comprises a final stage of at least 30 minutes at a temperature from about 210 to about 350° C.

7. Expanded material according to claim 5, wherein said heating is performed under a pressure of 0.08 to 0.12 MPa.

8. Expanded material according to claim 1, wherein it is obtained by heating a composition comprising 50 to 99% by weight of at least one thermosetting oligomer resin with nadimide or methyl-nadimide ends having an average molecular weight of 1,000 to 10,000 in number and of 1 to 50% by weight of at least one thermoplastic linear polymer chosen from the polysulfides, the polyetherimides, the linear arylaliphatic polyimides, the polyimidesiloxanes, the polyetherketones and the polysulfones.

9. Expanded material according to claim 8, wherein said thermoplastic linear polymer is a polyetherimide, an arylaliphatic polyimide or a polyethersulfone.

10. Expanded material according to claim 8, wherein said composition comprises 80 to 99% by weight of at least one oligomer resin with nadimide or methyl-nadimide ends and 1 to 20% by weight of at least one thermoplastic linear polymer.

11. Expanded material according to claim 8, wherein the heating of said composition comprises a final stage of at least 30 minutes at a temperature from about 210° C. to about 350° C.

12. Expanded material according to claim 8, wherein said heating is performed under a pressure of 0.08 to 0.12 MPa.

13. Expanded material according to claim 6, wherein said heating is performed under a pressure of 0.08 to 0.12 MPa.

14. Expanded material according to claim 9, wherein said composition comprises 80 to 99% by weight of at least one oligomer resin with nadimide or methyl-nadimide ends and 1 to 20% by weight of at least one thermoplastic linear polymer.

15. Expanded material according to claim 9, wherein the heating of said composition comprises a final stage of at least 30 minutes at a temperature from about 210° C. to about 350° C.

16. Expanded material according to claim 10, wherein the heating of said composition comprises a final stage of at least 30 minutes at a temperature from about 210° C. to about 350° C.

17. Expanded material according to claim 9, wherein said heating is performed under a pressure of 0.08 to 0.12 MPa.

18. Expanded material according to claim 10, wherein said heating is performed under a pressure of 0.08 to 0.12 MPa.

19. Expanded material according to claim 11, wherein said heating is performed under a pressure of 0.08 to 0.12 MPa.

20. Expanded material according to claim 19, wherein said thermoplastic linear polymer is a polyetherimide, an arylaliphatic polyimide or a polyethersulfone.

* * * * *